United States Patent [19]
Stephenson

[11] Patent Number: 6,006,118
[45] Date of Patent: Dec. 21, 1999

[54] KEYPAD LIGHTGUIDES INCLUDING COMPARTMENTS

[75] Inventor: Shawn M. Stephenson, Raleigh, N.C.

[73] Assignee: Ericsson Inc., Research Triangle Park, N.C.

[21] Appl. No.: 08/985,490

[22] Filed: Dec. 5, 1997

[51] Int. Cl.[6] .............................. H04M 1/22; H04Q 7/32
[52] U.S. Cl. .......................... 455/575; 455/550; 455/90; 362/24
[58] Field of Search ...................................... 455/575, 550, 455/90, 128, 347, 350; 379/428, 429, 396, 370, 433, 440, 456; 362/24

[56] References Cited

U.S. PATENT DOCUMENTS

| | | | |
|---|---|---|---|
| 4,349,705 | 9/1982 | Kuhfus | 379/429 |
| 5,130,897 | 7/1992 | Kuzma | 362/24 |
| 5,555,550 | 9/1996 | Kaschke | 455/566 |
| 5,708,428 | 1/1998 | Phillips | 341/22 |
| 5,739,481 | 4/1998 | Baumhauer, Jr. et al. | 181/148 |
| 5,746,493 | 5/1998 | Jonsson et al. | 362/24 |
| 5,867,772 | 2/1999 | Jonsson et al. | 455/90 |

*Primary Examiner*—Dwayne D. Bost
*Assistant Examiner*—Erika A. Gary
*Attorney, Agent, or Firm*—Myers Bigel Sibley & Sajovec, P.A.

[57] ABSTRACT

A lightguide for illuminating keypads within electronic devices, such as radiotelephones, supports additional components and is maintained in spaced apart relationship with a circuit board hosting electronic components. The number of separate components required within a radiotelephone is decreased and the amount of circuit board real estate available for electrical components is increased.

97 Claims, 6 Drawing Sheets

KEYPAD LIGHTGUIDES INCLUDING COMPARTMENTS

FIELD OF THE INVENTION

The present invention relates generally to electronic devices, and more particularly to electronic devices having illuminated keypads, such as radiotelephones.

BACKGROUND OF THE INVENTION

Radiotelephones, such as cellular telephones, have become increasingly popular for both personal and commercial use. Radiotelephones have also become smaller to facilitate storage and portability. Consequently, space or "real estate" on circuit boards hosting electronic components within radiotelephones has become somewhat limited.

A lightguide within a radiotelephone may be utilized to illuminate a keypad of translucent keys via a light source internal to the radiotelephone. A lightguide may also be utilized to support a keypad and a liquid crystal display (LCD) for the radiotelephone. The lightguide may be placed directly on a circuit board hosting electronic components for generating and receiving telecommunications signals. As a result, a lightguide can occupy a significant amount of circuit board real estate. As a result, circuit board space beneath a lightguide may be generally unusable for hosting electronic components thereon. Furthermore, circuit board space beneath a lightguide may be unusable for vias because contact pads associated with the keypad of the radiotelephone are located on the circuit board.

The speaker and microphone of a radiotelephone are typically mounted within the front cover of the radiotelephone housing and are hard-wired to the circuit board. Reflective tape is typically placed on the back of a lightguide to reflect light from a light source into the LCD and keypad. Shielding of electromagnetic interference (EMI) generated within the radiotelephone is often achieved using a shield can soldered to the circuit board. In addition, the inside surface of the housing top cover may be coated with a conductive material to provide EMI shielding.

The number of components mounted to a radiotelephone top cover as well as the addition of conductive material for EMI shielding can complicate and increase the costs associated with radiotelephone assembly. Furthermore, mounting radiotelephone components to housing covers does not facilitate interchangeability of housing covers between various radiotelephone models.

SUMMARY OF THE INVENTION

It is therefore an object of the present invention to provide electronic devices having keypad lightguides therewithin, such as radiotelephones, with increased circuit board real estate.

It is another object of the present invention to simplify radiotelephone assembly and reduce manufacturing costs.

It is yet another object of the present invention to facilitate the interchangeability of housing covers among different radiotelephone models.

These and other objects of the present invention are provided by allowing the keypad lightguide of an electronic device to support additional components and by maintaining the lightguide in spaced apart relationship with an underlying circuit board. Accordingly, the number of separate components required within an electronic device, such as a radiotelephone, can be decreased, and the amount of available circuit board real estate can be increased.

According to aspects of the present invention, a radiotelephone includes a housing, a keypad, a lightguide for illuminating the keypad from a light source within the radiotelephone, and various electronic components for receiving and transmitting telecommunications signals secured to a circuit board. A face of the circuit board also includes a plurality of contact pads thereon. The lightguide is secured within the housing in spaced apart relationship with the circuit board to define one or more compartments between the lightguide and the circuit board face.

One or more wall portions may depend from a face of the lightguide to maintain a spaced-apart relationship between the lightguide and the circuit board. These wall portions may be configured to contact the circuit board face to thereby define one or more compartments between the circuit board face and the lightguide face when the lightguide is secured within the housing. For example, a wall portion may depend from the lightguide along peripheral edge portions thereof to define a compartment between the circuit board face and the lightguide. Additional wall portions may be utilized to create additional compartments. These compartments provide additional space within which electronic components may be secured to the circuit board. By maintaining the circuit board and lightguide in a spaced apart relationship, otherwise unusable circuit board real estate may be made available for additional electronic components and vias.

A keypad may be secured to the lightguide and may comprise a plurality of translucent keys. Each key has a first end extending through the housing to facilitate operation of the radiotelephone by a user. Each key also has a second end extending through the lightguide. The second end of each key is operably engageable with a respective contact pad on the circuit board face.

A speaker may be secured to the lightguide. When the lightguide is assembled within the housing, electrical contact between the circuit board and speaker is achieved via respective contacts. The need for hard-wiring the speaker to the circuit board is thereby eliminated. Vibration reduction materials and devices may be positioned between the speaker and the radiotelephone housing for reducing speaker vibrations, and the effects of impacts and jarring. A microphone and an LCD may be secured to the lightguide as well. These components may also be configured to make direct electrical contact with the circuit board, thereby eliminating the need for hard-wiring. According to another aspect of the present invention, conductive material may be provided within the compartments between the lightguide and the circuit board for EMI shielding purposes.

The present invention, when utilized within radiotelephones, can optimize circuit board real estate, reduce the number of components within a radiotelephone, and simplify radiotelephone assembly. Because additional components, such as speakers and microphones may be mounted on the lightguide, interchangeability of housing top covers is also facilitated, which can reduce manufacturing costs. Furthermore, by mounting these components in the lightguide, LCD reflective tape and shield cans may no longer be required. By providing conductive material on or within the lightguide, the need for applying conductive material to the housing top cover may also be eliminated.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
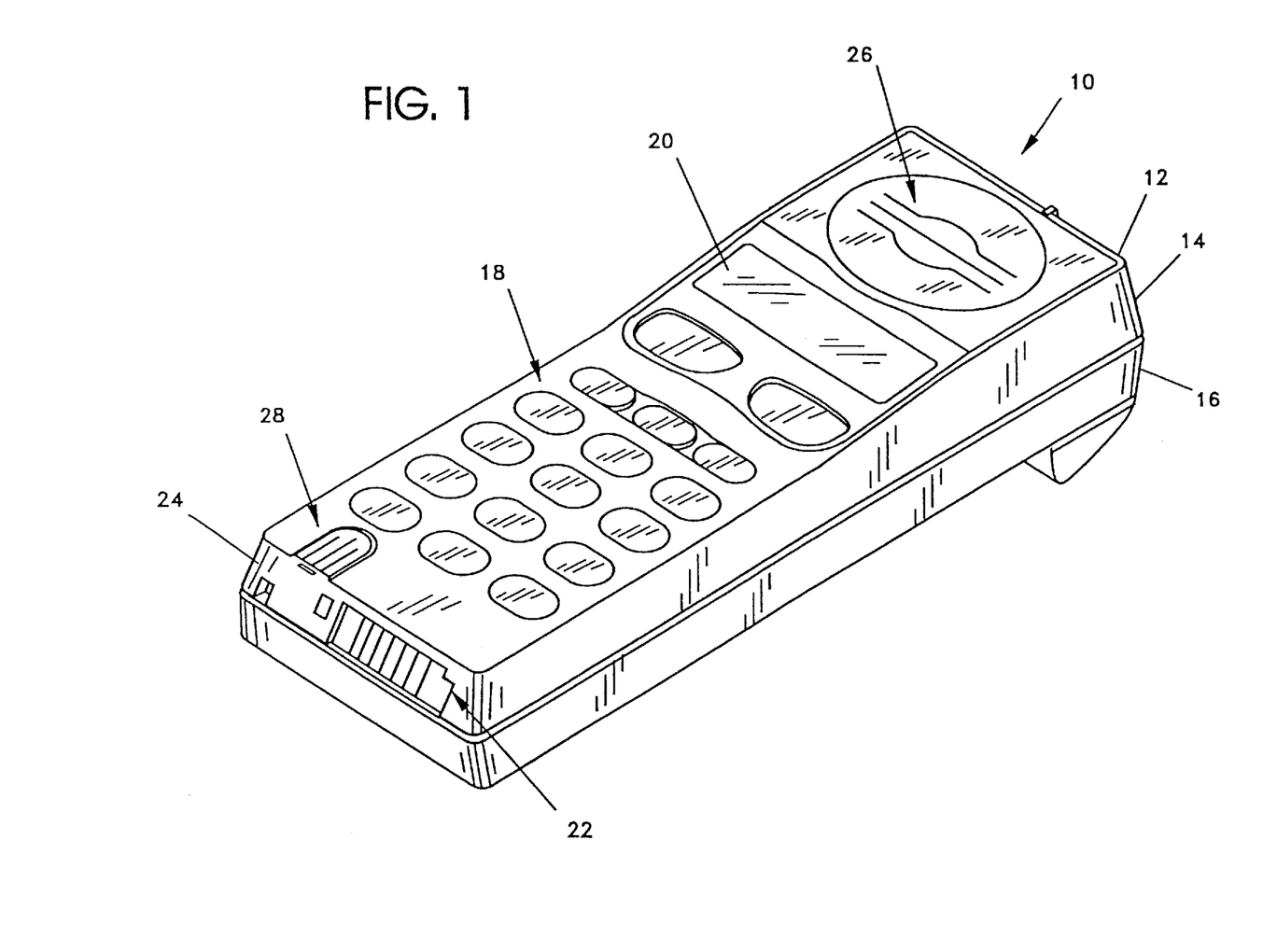
FIG. 1 illustrates an exemplary radiotelephone within which aspects of the present invention may be incorporated.

Referring now to FIG. 1, a conventional radiotelephone 10 includes a housing 12 having a top portion 14 and a bottom portion 16. The top and bottom housing portions 14, 16 enclose electronic components that enable the radiotelephone 10 to transmit and receive telecommunications signals. An antenna (not shown) for receiving telecommunications signals is typically provided, and a keypad 18, and display window 20 facilitate radiotelephone operation. Electrical connectors 22 on a bottom portion 24 of the illustrated radiotelephone housing 12 are configured to connect with external electrical connectors to facilitate hands-free operation of the radiotelephone, recharging of batteries within the radiotelephone, and the like. Slots 26 are provided at one end of the radiotelephone 10 for allowing a user to hear audio communications via a speaker enclosed within the housing 12. Slots 28 are provided at an opposite end of the radiotelephone 10 for allowing a user to speak into a microphone enclosed within the housing 12.

Figure 2:
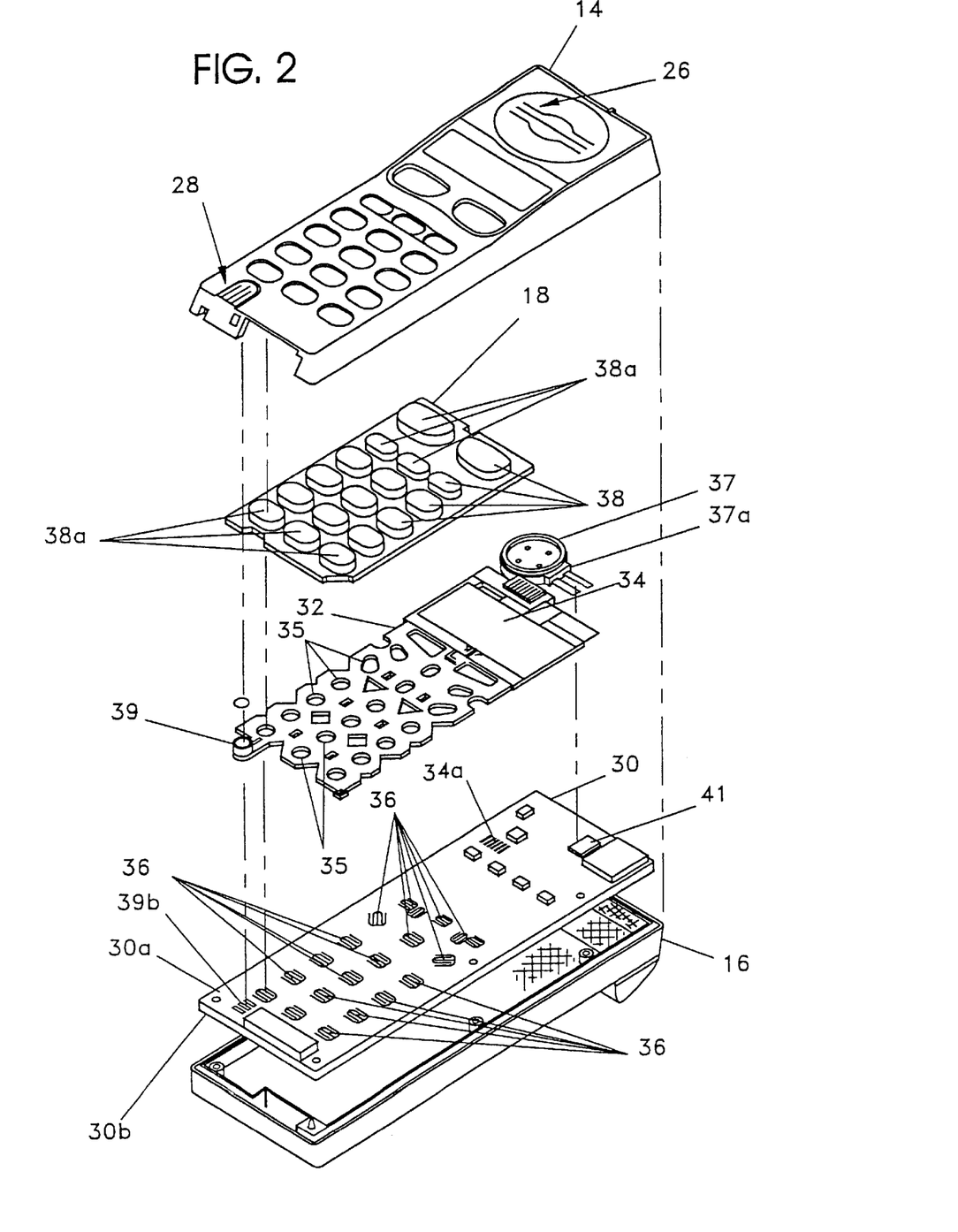
FIG. 2 is an exploded perspective view of a circuit board, lightguide, and keypad according to aspects of the present invention, and configured to be contained within the housing of the radiotelephone illustrated in FIG. 1.
Figure 3:
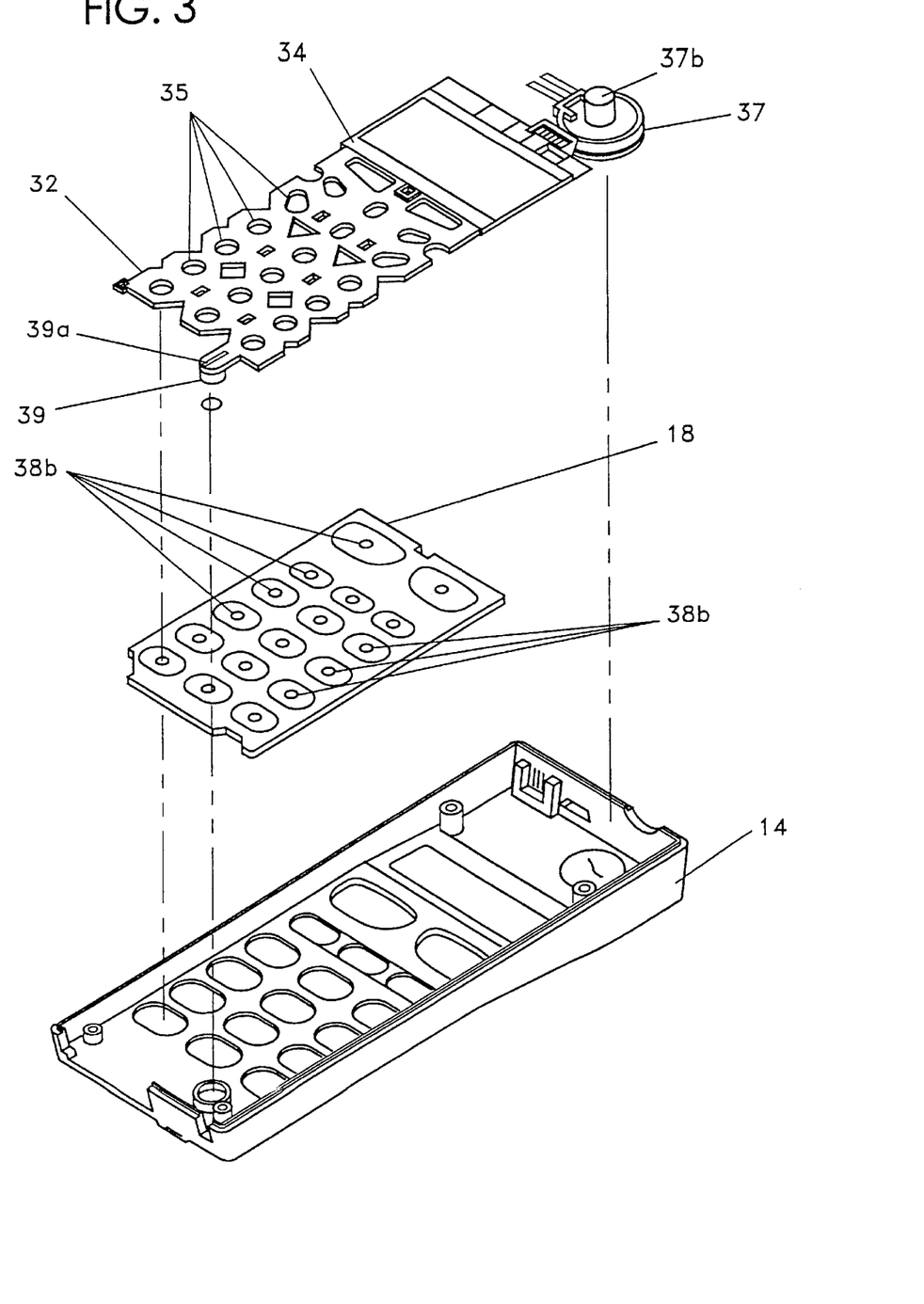
FIG. 3 is an exploded perspective view from below of a lightguide and keypad according to aspects of the present invention, and configured to be contained within the housing of the radiotelephone illustrated in FIG. 1.

Referring now to FIGS. 2–3, an exploded perspective view is provided of internal components contained within the housing 12 of a radiotelephone 10. Illustrated components include a circuit board 30, lightguide 32, and keypad 18. As is known to those skilled in the art, various electronic components that enable the radiotelephone 10 to transmit and receive telecommunications signals are mounted on the circuit board 30. The illustrated circuit board includes opposing first and second faces 30a, 30b. Most electronic components are attached to the circuit board second face 30b because contact pads 36 are located on the circuit board first face 30a and because the lightguide 32 overlies and is in direct contact with the circuit board first face. The contact pads 36 are positioned so that a respective contact pad is positioned beneath a respective key of the overlying keypad 18. As a result, the contact pads 36 utilize a significant amount of surface area of the circuit board first face 30a.

The lightguide 32 is configured to illuminate a keypad having translucent keys by directing light generated by one or more light sources to the underside portion of each key. As is known to those skilled in the art, a lightguide allows point sources of light to be distributed evenly over a surface area. A lightguide provides the necessary key travel distance required for the correct actuation and tactile feel when keypads having detents (i.e., the clicking feeling of keys when pressed) are utilized. A lightguide also holds the LCD and distributes light evenly to back light the LCD. Preferably, one or more light sources (not shown) are mounted to the circuit board first face 30a. As is understood by those skilled in the art, preferred light sources for use in illuminating keypads of electronic devices such as radiotelephones, include light emitting diodes (LEDs), and the like.

Lightguides are typically made from polymeric material including, but not limited to, polycarbonate, acrylic, ABS, and blends. The present invention may be utilized with other back lighting technologies including, but not limited to, electroluminescence. Electroluminescence relates to a thin film, typically less than 0.5 millimeter (mm) thick, that glows when a voltage is applied. In addition, the present invention may be utilized where LEDs are incorporated within each key of a keypad.

The illustrated lightguide 32 includes a plurality of apertures 35 formed therethrough. Each aperture 35 is configured to align with a respective key of the overlying keypad 18, as described below. An LCD 34 is attached to the illustrated lightguide 32 and is viewable through the display window 20 of the top housing portion 14 when the illustrated radiotelephone 10 is assembled. LCD 34 makes electrical contact with the circuit board 30 via electrical contacts 34a, as illustrated. A speaker 37 is also attached to the lightguide 32 as illustrated, and is configured to align approximately with the slots 26 in the top housing portion 14 when the illustrated radiotelephone 10 is assembled. A microphone 39 is also attached to the lightguide 32 as illustrated, and is configured to align approximately with the slots 28 in the top housing portion 14 when the illustrated radiotelephone 10 is assembled.

When the radiotelephone 10 is assembled, the lightguide 32 overlies the circuit board 30 so that an electrical contact 37a on the speaker 37 makes contact with electrical contact 41 on the circuit board to establish electrical communication therebetween. A pad 37b provides a counter force to that exerted on the speaker by contact between the speaker electrical contact 37a and circuit board contact 41. Also, when the radiotelephone 10 is assembled, the lightguide 32 overlies the circuit board 30 so that electrical contact 39a on the microphone 39 makes contact with electrical contact 39b on the circuit board and electrical communication is established therebetween. By attaching the speaker 37 and/or microphone 39 to the lightguide 32, interchangeability of the top housing portion 14 among various radiotelephone models is facilitated. Furthermore, the need for hard-wiring a speaker 37 and/or microphone 39 to the circuit board may be eliminated, thereby simplifying radiotelephone assembly.

Still referring to FIGS. 2–3, the illustrated keypad 18 overlies the lightguide 32 and has a plurality of translucent keys 38 arranged for user operation. Each illustrated key 38 has a first end 38a configured to extend through the top housing portion 14 for user access, and a second end 38b extending through a respective aperture 35 in the lightguide 32. Each key 38 is positioned to be operably engageable with a respective contact pad 36 on the circuit board first face 30a. When a user presses a key 38, the second end 38b of the key extends through a respective aperture 35 in the lightguide 32 and makes contact with a respective contact pad 36.

Figure 4:
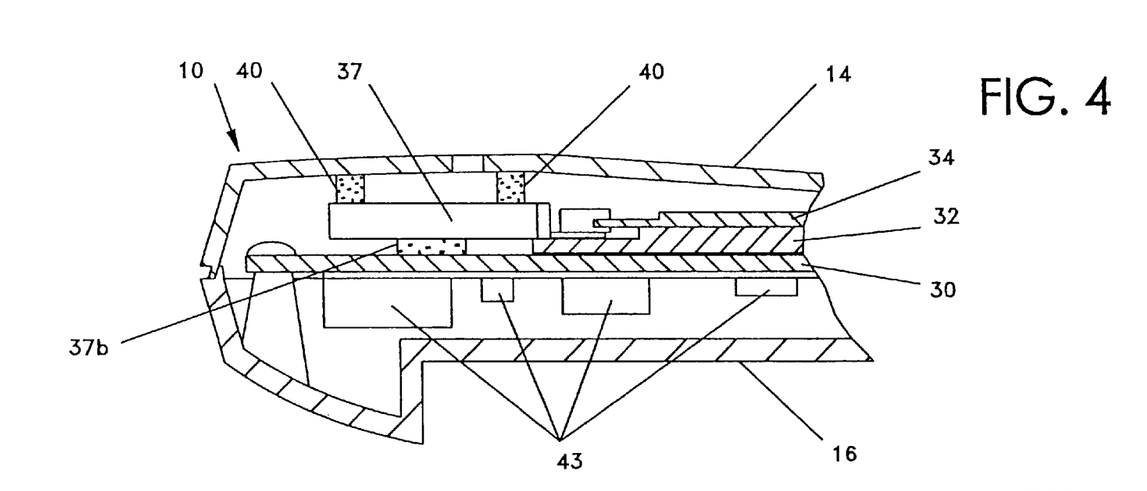
FIG. 4 is a cross-sectional view of a radiotelephone with a speaker mounted to a lightguide and incorporating vibration reduction pads, according to aspects of the present invention.

Referring now to FIG. 4, a cross-sectional view of an assembled radiotelephone 10 is shown illustrating the relationship of the circuit board 30 and lightguide 32 incorporating aspects of the present invention. As illustrated, electrical components 43 are primarily located on the circuit board second face 30b. The lightguide 32 is in direct contact with the circuit board first face 30a. A speaker 37 is mounted to the lightguide 32 and is in electrical contact with the circuit board 30 via contact 37a, as illustrated. Vibration reduction devices 40, such as pads or springs, are preferably provided to protect the speaker against jarring and other impact forces during use. As would be understood by those skilled in the art, various types of devices may be used to reduce vibration and jarring without departing from the spirit and intent of the present invention.

Figure 5:
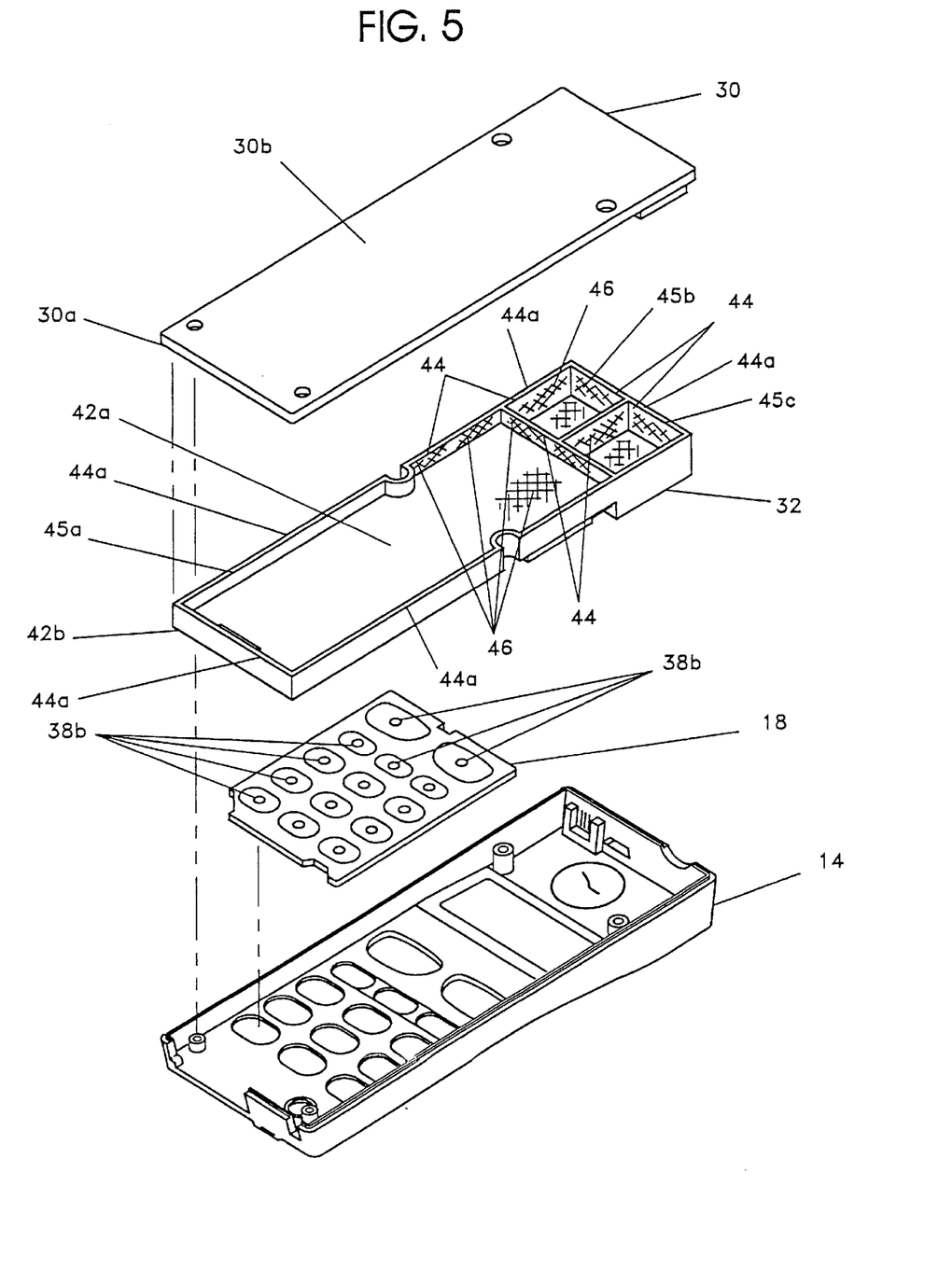
FIG. 5 is an exploded perspective view from below of the internals of a radiotelephone wherein a lightguide is configured with multiple compartments and conductive material for EMI shielding.
Figure 6:
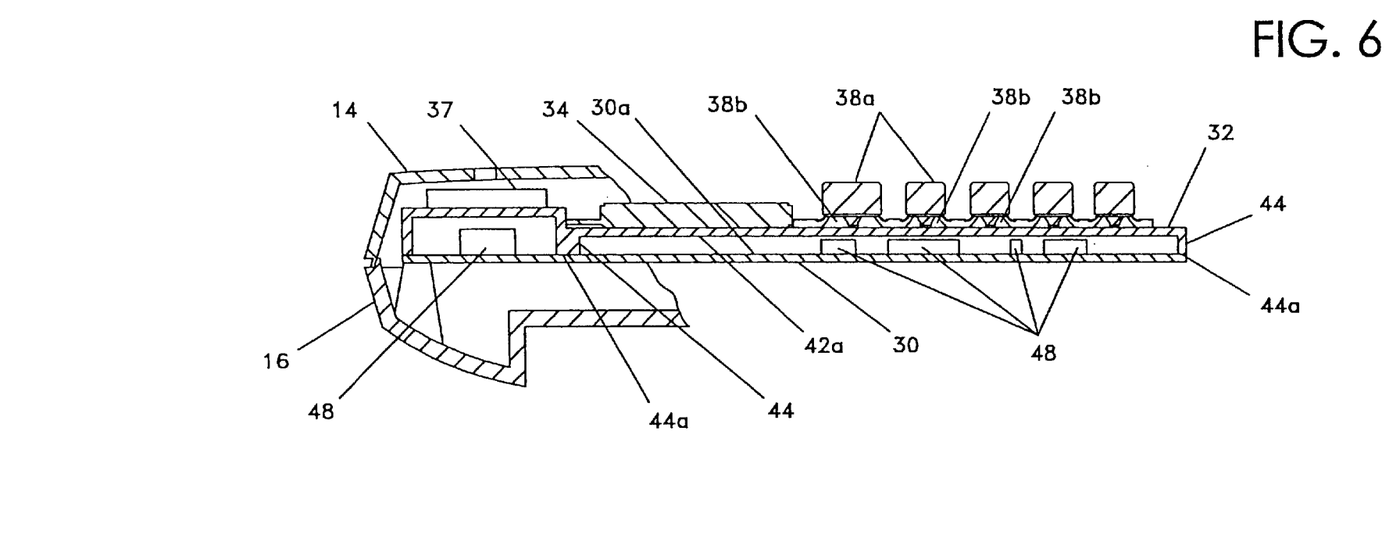
FIG. 6 is a cross-sectional view of a radiotelephone having a lightguide in spaced apart relationship with a circuit board to define a compartment between the lightguide and the circuit board, according aspects of the present invention.
Figure 7:
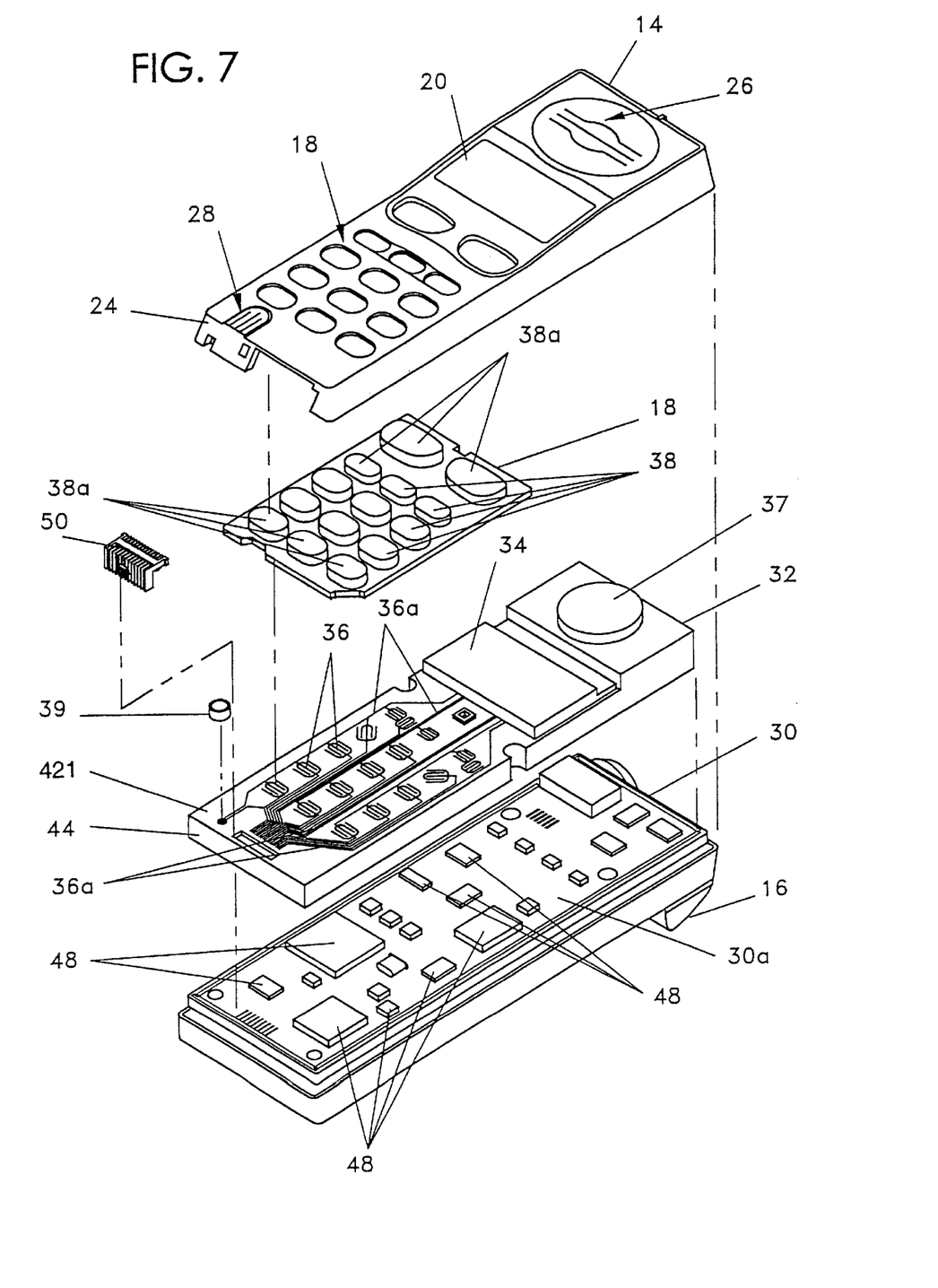
FIG. 7 is an exploded perspective view of the internals of a radiotelephone wherein a lightguide has contact pads integral therewith and operably engageable with an overlying keypad, according to aspects of the present invention.

Referring now to FIGS. 5–7, a lightguide 32 incorporating additional aspects of the present invention is illustrated. The lightguide includes first and second opposing faces 42a, 42b. Walls 44 extend from the first face 42a, as illustrated, to form multiple compartments 45a, 45b, 45c. It is understood, however, that a lightguide incorporating aspects of the present invention is not limited to the illustrated compartment configuration. The walls 44 may be configured in various ways to form one or more compartments. For example, the walls 44 may extend from the lightguide first face 42a along the periphery of the first face to define a single compartment.

As illustrated in FIG. 6, when the lightguide 32 is assembled within a radiotelephone 10, the edge portions 44a of the walls 44 make contact with the circuit board first face 30a such that the compartments 45a, 45b, 45c overlie the circuit board 30 and the lightguide first face 42a is maintained in a spaced-apart adjacent relationship with the circuit board first face 30a. The walls 44 preferably have a height sufficient to allow various electronic components 48 to be secured to the circuit board first face 30a beneath the lightguide. By providing one or more compartments between the circuit board 30 and the overlying lightguide 32, according to the present invention, available circuit board surface area is increased. It is understood that the present invention is not limited to the illustrated spaced apart configuration of the lightguide 32 and the circuit board 30. Other ways of maintaining the lightguide 32 and the circuit board 30 in spaced apart relationship may be utilized.

Preferably, the walls 44 and wall edge portions 44a include conductive material 46 for providing EMI shielding of the electronic components mounted to the circuit board first face 30a within the various compartments 45a, 45b, 45c. In the illustrated embodiment, the conductive material is applied to either the outer and/or inner surface of the walls 44 (FIG. 5). Various techniques are known for applying conductive material to the surface of non-conductive materials, including vacuum metallization, conductive paints, electro and/or electroless plating. However, other types of conductive plating may be used to provide EMI shielding. As is known to those skilled in the art, conductive material may be integral with the material of the walls 44. By providing conductive material on or within the walls 44 extending from the lightguide 32, the need for applying conductive material to the housing top cover may be eliminated.

Referring now to FIG. 7, another aspect of the present invention is illustrated. Additional circuit board real estate may be recovered by moving the contact pads 36 and associated traces 36a from the circuit board first face 30a to the lightguide 32. The contact pads 36 and associated traces 36a may be incorporated as an integral part of the lightguide 32, or as a flexible film overlying the lightguide. According to another aspect of the present invention, the contact pads 36 and associated traces 36a may be incorporated into the keypad 18.

In the illustrated embodiment, the keypad 18 overlies the lightguide 32 such that each key first end 38a is configured to extend through the top housing portion 14. Each key second end 38b is positioned to be operably engageable with a respective contact pad 36 on the lightguide 32. When a user presses a key 38, the second end 38b of the key makes contact with a respective contact pad 36. In the illustrated embodiment, the contact pads 36 and associated traces 36a are electrically connected with the circuit board 30 via a connector 50. In essence, the light guide 32 serves as a child circuit board of circuit board 30.

By removing the contact pads 36 and associated traces 36a from the circuit board first face 30a, additional electronic components 48 can be mounted to the circuit board first face 30a, in the area formerly occupied by the contact pads 36, as illustrated. Additionally, more surface area is available for vias and other signal traces. By maintaining the lightguide 32 and circuit board first face 30a in spaced apart relationship and by removing the contact pads 36 and associated traces 36a from the circuit board first face 30a, circuit board real estate is greatly increased.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone apparatus comprising:
   a housing configured to enclose electronic components that receive and transmit telecommunications signals and having mounted therein at least one light source;
   a circuit board having a plurality of contact pads on a face thereof;
   a keypad; and
   a lightguide that illuminates said keypad via said at least one light source,
   wherein said keypad is secured to said lightguide and comprises a plurality of translucent keys, each key having a first end extending through said housing and a second end extending through said lightguide and operably engageable with a respective contact pad on said circuit board face, wherein said lightguide comprises conductive material that provides EMI shielding, and wherein said lightguide is secured within said housing in spaced apart relationship with said circuit board to define at least one compartment between said lightguide and said circuit board face.

2. A radiotelephone apparatus according to claim 1 further comprising a speaker secured to said lightguide.

3. A radiotelephone apparatus according to claim 2 further comprising vibration reduction means positioned between said speaker and said housing for reducing speaker vibrations.

4. A radiotelephone apparatus according to claim 1 further comprising a microphone secured to said lightguide.

5. A radiotelephone apparatus according to claim 1 further comprising an LCD panel secured to said lightguide.

6. A radiotelephone apparatus according to claim 1 wherein at least one electronic component is secured to said circuit board face within said at least one compartment.

7. A radiotelephone apparatus according to claim 1 wherein said at least one compartment comprises a plurality of compartments.

8. An electronic device comprising:

a housing configured to enclose electronic components;

a circuit board having a plurality of contact pads on a face thereof;

a lightguide comprising opposing first and second faces and configured to illuminate a keypad via at least one light source, said lightguide comprising at least one wall portion depending from said first face and configured to contact said circuit board face to define at least one compartment between said circuit board face and said first face when said lightguide is secured within said housing wherein said lightguide comprises conductive material that provides EMI shielding within said at least one compartment; and a keypad secured to said second face and comprising a plurality of translucent keys, each key having a first end extending through said housing and a second end extending through said lightguide and operably engageable with a respective contact pad on said circuit board face.

9. A electronic device according to claim 8 further comprising a speaker secured to said lightguide.

10. An electronic device according to claim 9 further comprising vibration reduction means positioned between said speaker and said housing for reducing speaker vibrations.

11. An electronic device according to claim 8 further comprising a microphone secured to said lightguide.

12. An electronic device according to claim 8 further comprising an LCD panel secured to said lightguide.

13. An electronic device according to claim 8 wherein at least one electronic component is secured to said circuit board within said at least one compartment.

14. An electronic device according to claim 8 wherein said at least one wall portion comprises a plurality of wall portions depending from said first face and configured to contact said circuit board face to define a plurality of compartments between said circuit board face and said first face when said lightguide is secured within said housing.

15. An electronic device according to claim 8 wherein said electronic device is a radiotelephone.

16. An electronic device comprising:

a housing configured to enclose electronic components;

a circuit board having a plurality of contact pads on a face thereof;

a lightguide comprising opposing first and second faces and configured to illuminate a keypad via at least one light source, said lightguide comprising at least one wall portion depending from said first face along peripheral edge portions thereof to define at least one compartment between said circuit board face and said lightguide first face when said lightguide is secured within said housing, wherein said lightguide comprises conductive material that provides EMI shielding; and a keypad secured to said second face and comprising a plurality of translucent keys, each key having a first end extending through said housing and a second end extending through said lightguide and operably engageable with a respective contact pad on said circuit board face.

17. An electronic device according to claim 16 further comprising a speaker secured to said lightguide.

18. An electronic device according to claim 17 further comprising vibration reduction means positioned between said speaker and said housing for reducing speaker vibrations.

19. An electronic device according to claim 16 further comprising a microphone secured to said lightguide.

20. An electronic device according to claim 16 further comprising an LCD panel secured to said lightguide.

21. An electronic device according to claim 16 wherein at least one electronic component is secured to said circuit board within said at least one compartment.

22. An electronic device according to claim 16 wherein said at least one compartment comprises a plurality of compartments.

23. An electronic device according to claim 16 wherein said electronic device is a radiotelephone.

24. A lightguide configured to illuminate a keypad of an electronic device via at least one light source located within said electronic device, said lightguide comprising:

opposing first and second faces;

a keypad secured to said second face and comprising a plurality of translucent keys, each key having a first end extending through said lightguide and operably engageable with a respective contact pad within said electronic device; and conductive material that provides EMI shielding disposed on at least one of said first and second faces.

25. A lightguide according to claim 24 further comprising a speaker secured to said lightguide.

26. A lightguide according to claim 24 further comprising vibration reduction means for reducing speaker vibrations.

27. A lightguide according to claim 24 further comprising a microphone secured to said lightguide.

28. A lightguide according to claim 24 further comprising an LCD panel secured to said lightguide.

29. A lightguide according to claim 24 further comprising at least one wall portion depending from said first face to define at least one compartment between said lightguide first face and another substrate when said lightguide is secured within said electronic device.

30. A lightguide according to claim 24 wherein said electronic device is a radiotelephone.

31. A radiotelephone apparatus comprising:

a housing configured to enclose electronic components that receive and transmit telecommunications signals and having mounted therein at least one light source;

a circuit board having a plurality of contact pads on a face thereof;

a keypad; and a lightguide that illuminates said keypad via said at least one light source, wherein said keypad is secured to said lightguide and comprises a plurality of translucent keys, each key having a first end extending through said housing and a second end extending through said lightguide and operably engageable with a respective contact pad on said circuit board face, and wherein said lightguide is secured within said housing in spaced apart relationship with said circuit board to define a plurality of compartments between said lightguide and said circuit board face.

32. A radiotelephone apparatus according to claim 31 further comprising a speaker secured to said lightguide.

33. A radiotelephone apparatus according to claim 32 further comprising vibration reduction means positioned between said speaker and said housing for reducing speaker vibrations.

34. A radiotelephone apparatus according to claim 31 further comprising a microphone secured to said lightguide.

35. A radiotelephone apparatus according to claim 31 further comprising an LCD panel secured to said lightguide.

36. A radiotelephone apparatus according to claim 31 wherein said lightguide comprises conductive material that provides EMI shielding.

37. A radiotelephone apparatus according to claim 31 wherein at least one electronic component is secured to and circuit board face within said at least one compartment.

38. An electronic device comprising:

a housing configured to enclose electronic components;

a circuit board having a plurality of contact pads on a face thereof;

a lightguide comprising opposing first and second faces and configured to illuminate a keypad via at least one light source, said lightguide comprising a plurality of wall portions depending from said first face and configured to contact said circuit board face to define a plurality of compartments between said circuit board face and said first face when said lightguide is secured within said housing; and a keypad secured to said second face and comprising a plurality of translucent keys, each key having a first end extending through said housing and a second end extending through said lightguide and operably engageable with a respective contact pad on said circuit board face.

39. A electronic device according to claim 38 further comprising a speaker secured to said lightguide.

40. An electronic device according to claim 39 further comprising vibration reduction means positioned between said speaker and said housing for reducing speaker vibrations.

41. An electronic device according to claim 38 further comprising a microphone secured to said lightguide.

42. An electronic device according to claim 38 further comprising an LCD panel secured to said lightguide.

43. An electronic device according to claim 38 wherein said lightguide comprises conductive material that provides EMI shielding within said at least one compartment.

44. An electronic device according to claim 38 wherein at least one electronic component is secured to said circuit board within said at least one compartment.

45. An electronic device according to claim 38 wherein said electronic device is a radiotelephone.

46. An electronic device comprising:

a housing configured to enclose electronic components;

a circuit board having a plurality of contact pads on a face thereof;

a lightguide comprising opposing first and second faces and configured to illuminate a keypad via at least one light source, said lightguide comprising at least one wall portion depending from said first face along peripheral edge portions thereof to define a plurality of compartments between said circuit board face and said lightguide first face when said lightguide is secured within said housing, a keypad secured to said second face and comprising a plurality of translucent keys, each key having a first end extending through said housing and a second end extending through said lightguide and operably engageable with a respective contact pad on said circuit board face.

47. An electronic device according to claim 46 further comprising a speaker secured to said lightguide.

48. An electronic device according to claim 47 further comprising vibration reduction means positioned between said speaker and said housing for reducing speaker vibrations.

49. An electronic device according to claim 46 further comprising a microphone secured to said lightguide.

50. An electronic device according to claim 46 further comprising an LCD panel secured to said lightguide.

51. An electronic device according to claim 46 wherein said lightguide comprises conductive material that provides EMI shielding.

52. An electronic device according to claim 46 wherein at least one electronic component is secured to said circuit board within said compartments.

53. An electronic device according to claim 46 wherein said electronic device is a radiotelephone.

54. A radiotelephone apparatus comprising:

a housing configured to enclose electronic components that receive and transmit telecommunications signals and having mounted therein at least one light source;

a circuit board having a plurality of contact pads on a face thereof;

a keypad;

a lightguide that illuminates said keypad via said at least one light source, wherein said keypad is secured to said lightguide and comprises a plurality of translucent keys, each key having a first end extending through said housing and a second end extending through said lightguide and operably engageable with a respective contact pad on said circuit board face, wherein said lightguide is secured within said housing in spaced apart relationship with said circuit board to define at least one compartment between said lightguide and said circuit board face, and wherein said lightguide comprises conductive material that provides EMI shielding, a speaker secured to said lightguide; and an LCD panel secured to said lightguide.

55. A radiotelephone apparatus according to claim 54 further comprising vibration reduction means positioned between said speaker and said housing for reducing speaker vibrations.

56. A radiotelephone apparatus according to claim 54 further comprising a microphone secured to said lightguide.

57. A radiotelephone apparatus according to claim 54 wherein at least one electronic component is secured to said circuit board face within said at least one compartment.

58. A radiotelephone apparatus according to claim 54 wherein said at least one compartment comprises a plurality of compartments.

59. A radiotelephone apparatus comprising:
a housing configured to enclose electronic components that receive and transmit telecommunications signals and having mounted therein at least one light source;
a circuit board having a plurality of contact pads on a face thereof;
a keypad;
a lightguide that illuminates said keypad via said at least one light source,
wherein said keypad is secured to said lightguide and comprises a plurality of translucent keys, each key having a first end extending through said housing and a second end extending through said lightguide and operably engageable with a respective contact pad on said circuit board face, and
wherein said lightguide is secured within said housing in spaced apart relationship with said circuit board to define at least one compartment between said lightguide and said circuit board face, and wherein said lightguide comprises conductive material that provides EMI shielding:
a microphone secured to said lightguide; and
an LCD panel secured to said lightguide.

60. A radiotelephone apparatus according to claim 59 further comprising a speaker secured to said lightguide.

61. A radiotelephone apparatus according to claim 60 further comprising vibration reduction means positioned between said speaker and said housing for reducing speaker vibrations.

62. A radiotelephone apparatus according to claim 59 wherein at least one electronic component is secured to said circuit board face within said at least one compartment.

63. A radiotelephone apparatus according to claim 59 wherein said at least one compartment comprises a plurality of compartments.

64. An electronic device comprising;
a housing configured to enclose electronic components;
a circuit board having a plurality of contact pads on a face thereof;
a lightguide comprising opposing first and second faces and configured to illuminate a keypad via at least one light source, said lightguide comprising at least one wall portion depending from said first face and configured to contact said circuit board face to define at least one compartment between said circuit board face and said first face when said lightguide is secured within said housing, and wherein said lightguide comprises conductive material that provides EMI shielding within said at least one compartment;
a keypad secured to said second face and comprising a plurality of translucent keys, each key having a first end extending through said housing and a second end extending through said lightguide and operably engageable with a respective contact pad on said circuit board face;
a speaker secured to said lightguide; and
an LCD panel secured to said lightguide.

65. An electronic device according to claim 64 further comprising vibration reduction means positioned between said speaker and said housing for reducing speaker vibrations.

66. An electronic device according to claim 64 further comprising a microphone secured to said lightguide.

67. An electronic device according to claim 64 wherein at least one electronic component is secured to said circuit board within said at least one compartment.

68. An electronic device according to claim 64 wherein said at least one wall portion comprises a plurality of wall portions depending from said first face and configured to contact said circuit board face to define a plurality of compartments between said circuit board face and said first face when said lightguide is secured within said housing.

69. An electronic device according to claim 64 wherein said electronic device is a radiotelephone.

70. An electronic device comprising;
a housing configured to enclose electronic components;
a circuit board having a plurality of contact pads on a face thereof;
a lightguide comprising opposing first and second faces and configured to illuminate a keypad via at least one light source, said lightguide comprising at least one wall portion depending from said first face and configured to contact said circuit board face to define at least one compartment between said circuit board face and said first face when said lightguide is secured within said housing, and wherein said lightguide comprises conductive material that provides EMI shielding within said at least one compartment;
a keypad secured to said second face and comprising a plurality of translucent keys, each key having a first end extending through said housing and a second end extending through said lightguide and operably engageable with a respective contact pad on said circuit board face;
a microphone secured to said lightguide; and
an LCD panel secured to said light guide.

71. A electronic device according to claim 70 further comprising a speaker secured to said lightguide.

72. An electronic device according to claim 71 further comprising vibration reduction means positioned between said speaker and said housing for reducing speaker vibrations.

73. An electronic device according to claim 70 wherein at least one electronic component is secured to said circuit board within said at least one compartment.

74. An electronic device according to claim 70 wherein said at least one wall portion comprises a plurality of wall portions depending from said first face and configured to contact said circuit board face to define a plurality of compartments between said circuit board face and said first face when said lightguide is secured within said housing.

75. An electronic device according to claim 70 wherein said electronic device is a radiotelephone.

76. An electronic device comprising:
a housing configured to enclose electronic components;
a circuit board having a plurality of contact pads on a face thereof;
a lightguide comprising opposing first and second faces and configured to illuminate a keypad via at least one light source, said lightguide comprising at least one wall portion depending from said first face along peripheral edge portions thereof to define at least one compartment between said circuit board face and said lightguide first face when said lightguide is secured within said housing, and wherein said lightguide comprises conductive material that provides EMI shielding;
a keypad secured to said second face and comprising a plurality of translucent keys, each key having a first end extending through said housing and a second end extending through said lightguide and operably engageable with a respective contact pad on said circuit board face;

a speaker secured to said lightguide; and an LCD Panel secured to said lightguide.

77. An electronic device according to claim 76 further comprising vibration reduction means positioned between said speaker and said housing for reducing speaker vibrations.

78. An electronic device according to claim 76 further comprising a microphone secured to said lightguide.

79. An electronic device according to claim 76 wherein at least one electronic component is secured to said circuit board within said at least one compartment.

80. An electronic device according to claim 76 wherein said at least one compartment comprises a plurality of compartments.

81. An electronic device according to claim 76 wherein said electronic device is a radiotelephone.

82. An electronic device comprising:

a housing configured to enclose electronic components;

a circuit board having a plurality of contact pads on a face thereof;

a lightguide comprising opposing first and second faces and configured to illuminate a keypad via at least one light source, said lightguide comprising at least one wall portion depending from said first face along peripheral edge portions thereof to define at least one compartment between said circuit board face and said lightguide first face when said lightguide is secured within said housing, and wherein said lightguide comprises conductive material that provides EMI shielding;

a keypad secured to said second face and comprising a plurality of translucent keys, each key having a first end extending through said housing and a second end extending through said lightguide and operably engageable with a respective contact pad on said circuit board face;

a microphone secured to said lightguide; and an LCD panel secured to said lightguide.

83. An electronic device according to claim 82 further comprising a speaker secured to said lightguide.

84. An electronic device according to claim 83 further comprising vibration reduction means positioned between said speaker and said housing for reducing speaker vibrations.

85. An electronic device according to claim 82 wherein at least one electronic component is secured to said circuit board within said at least one compartment.

86. An electronic device according to claim 82 wherein said at least one compartment comprises a plurality of compartments.

87. An electronic device according to claim 82 wherein said electronic device is a radiotelephone.

88. A lightguide configured to illuminate a keypad of an electronic device via at least one light source located within said electronic device, said lightguide comprising:

opposing first and second faces;

a keypad secured to said second face and comprising a plurality of translucent keys, each key having a first end extending through said lightguide and operably engageable with a respective contact pad within said electronic device;

a speaker secured to said lightguide;

an LCD panel secured to said lightguide; and wherein the lightguide further comprises conductive material that provides EMI shielding.

89. A lightguide according to claim 88 further comprising vibration reduction means for reducing speaker vibrations.

90. A lightguide according to claim 88 further comprising a microphone secured to said lightguide.

91. A lightguide according to claim 88 further comprising at least one wall portion depending from said first face to define at least one compartment between said lightguide first face and another substrate when said lightguide is secured within said electronic device.

92. A lightguide according to claim 88 wherein said electronic device is a radiotelephone.

93. A lightguide configured to illuminate a keypad of an electronic device via at least one light source located within said electronic device, said lightguide comprising:

opposing first and second faces;

a keypad secured to said second face and comprising a plurality of translucent keys, each key having a first end extending through said lightguide and operably engageable with a respective contact pad within said electronic device;

a microphone secured to said lightguide;

an LCD panel secured to said lightguide; and wherein the lightguide further comprises conductive material that provides EMI shielding.

94. A lightguide according to claim 93 further comprising a speaker secured to said lightguide.

95. A lightguide according to claim 93 further comprising vibration reduction means for reducing speaker vibrations.

96. A lightguide according to claim 93 further comprising at least one wall portion depending from said first face to define at least one compartment between said lightguide first face and another substrate when said lightguide is secured within said electronic device.

97. A lightguide according to claim 93 wherein said electronic device is a radiotelephone .

* * * * *

UNITED STATES PATENT AND TRADEMARK OFFICE
CERTIFICATE OF CORRECTION

PATENT NO. : 6,006,118
DATED : December 21, 1999
INVENTOR(S) : Shawn M. Stephenson It is certified that errors appear in the above-identified patent and that said Letters Patent is hereby corrected as shown below:

In the Claims

Column 9, line 30, delete "and" and insert - - said - -.

Column 12, line 35, delete "light guide" and insert - - lightguide --.

Signed and Sealed this

Twenty-fourth Day of April, 2001

NICHOLAS P. GODICI

Attest:

Attesting Officer

Acting Director of the United States Patent and Trademark Office